Aug. 16, 1932.    C. A. MORGAN    1,871,722
WINDSHIELD WARMER
Filed Aug. 5, 1931
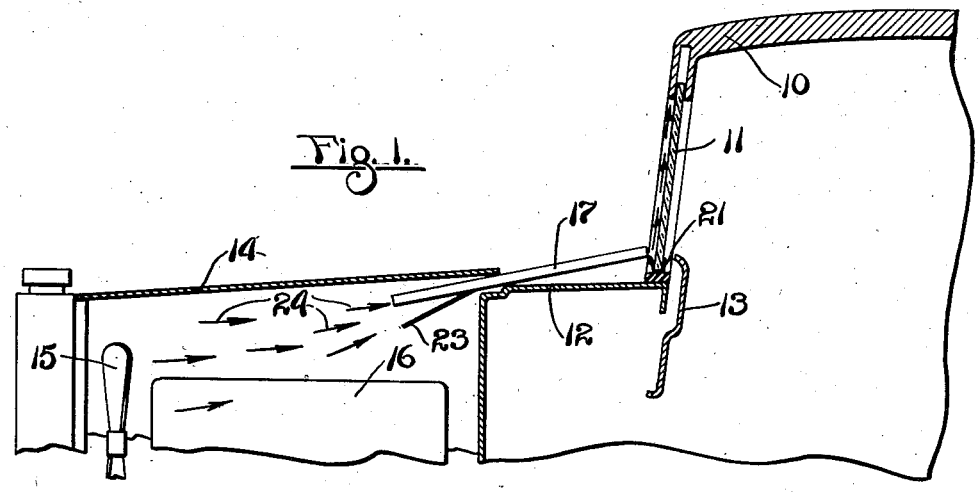
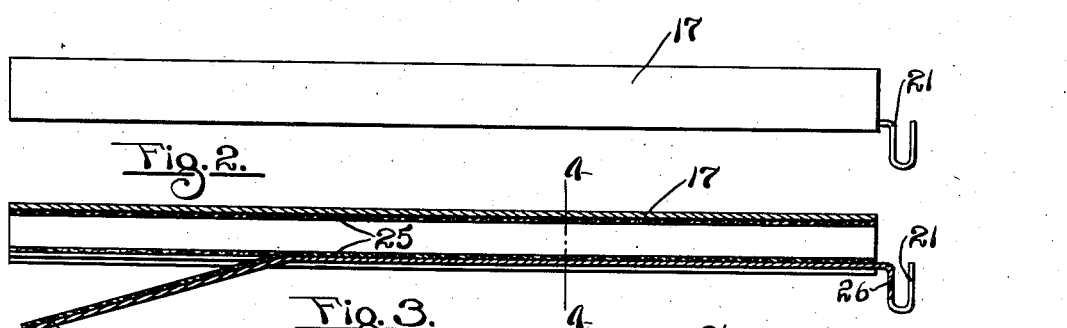
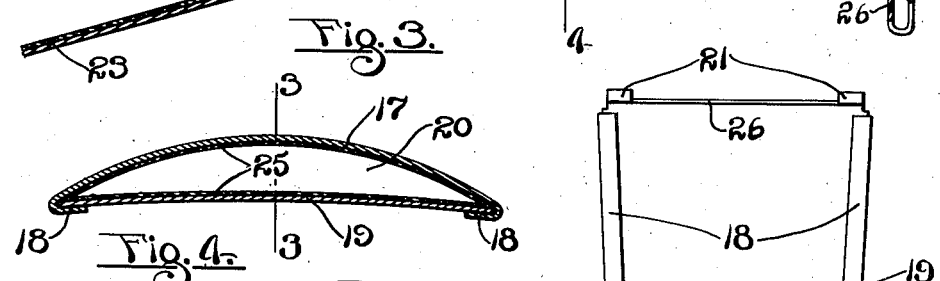
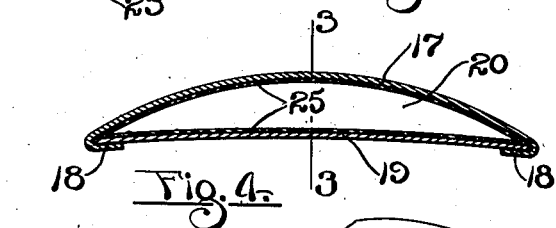
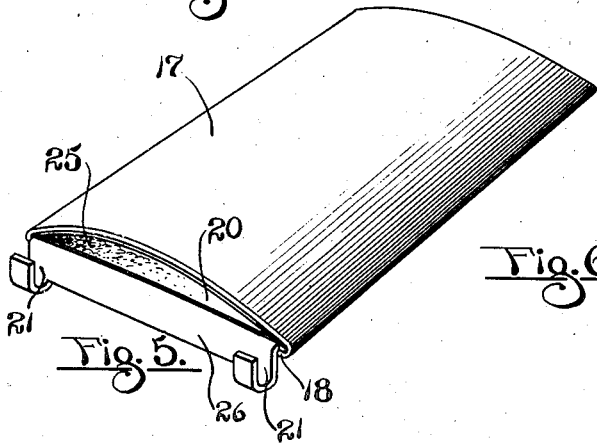
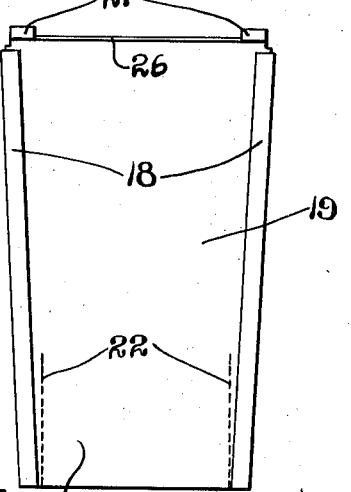
Inventor
Charles A. Morgan
By Livrance and Van Antwerp
Attorneys Patented Aug. 16, 1932

1,871,722

UNITED STATES PATENT OFFICE

CHARLES A. MORGAN, OF GRAND RAPIDS, MICHIGAN

WINDSHIELD WARMER

Application filed August 5, 1931. Serial No. 555,159.

This invention relates to windshield warmers for motor vehicles.

A primary object of the invention is to provide a device of this character for use in driving in cold weather to prevent ice and snow from adhering to outside of the windshield and also to prevent fog and moisture from collecting inside of the shield.

Another object of the invention is to so construct such a device that the hot air from the engine may be directed onto the windshield, thereby accomplishing the objects above set forth.

Still another advantage lies in the detachable means for installing the heating apparatus whereby the hot air may emerge from the outlet at exactly the right distance from the windshield regardless of the type of automobile on which it is installed.

In carrying out these objects, the invention is susceptible of a wide range of modifications without departing from the spirit or sacrificing any of the advantages of the claimed invention, there being shown in the drawing for illustration purposes a preferred and practical form in which;

Fig. 1 is a longitudinal cross section through the front part of an automobile showing the installation of my improved heating device.

Fig. 2 is a side view of my invention.

Fig. 3 is a view in cross section, this view being taken along the line 3—3 of Fig. 4.

Fig. 4 is a view taken along the plane of the line 4—4 of Fig. 3.

Fig. 5 is a perspective view of the finished article ready for installation.

Fig. 6 is a bottom view of the device, the dotted lines illustrating slits whereby a portion of the bottom member may be bent outwardly.

Like numerals refer to like parts throughout the several views.

In the embodiment illustrated, a portion of an automobile is shown at 10 having a windshield 11, a cowl 12, an instrument board 13, a hood 14, a fan 15 and an engine 16.

The windshield warmer constituting this invention comprises a curved upper member 17 having return bent portions 18 at either side thereof, see Fig. 4, and a lower member 19, of slightly curved form, engages in the channels formed by the return bent portions and hence a passageway 20 is formed. See Figs. 3, 4 and 5.

The lower member 19 has U-shaped hooks 21 at one end thereof, these hooks being received under the lower edge of the windshield and maintaining the upper end of the passageway 20 exactly the correct distance from the windshield whereby heat will be applied thereto and thus prevent the accumulation of ice and moisture thereon. An apron 26, see Fig. 5, extends between the hooks 21 and prevent any cold air from seeping underneath the outlet end of the tube and flowing upwardly along the windshield. This apron fits against the outer side of the windshield.

The lower member 19 is also slit as indicated at 22 whereby a portion 23, see Fig. 1, may be bent downwardly to receive the air from the fan 15 as indicated by the arrows 24. The inner side of the passageway 20 may be insulated as indicated by means of asbestos 25 as shown.

The operation is readily understood. Whenever it is desired to attach the same to an automobile, the windshield 11 of the car is raised and one side of the hood 14 is also raised. Then the device is placed over the cowl 12 as clearly shown in Fig. 1, the hooks 21 being placed underneath the lower edge of the windshield which is lowered thereupon to maintain the device in proper position and the lower end of the tube extends under the hood, the hood being lowered and fitting against the top member 17 of the device to thereby hold the same in position. The apron 26 abuts against the outer side of the shield 11, see Fig. 1, and hence only the warm air flowing from the tube contacts thereagainst.

Preferably the upper member 17 is fastened by soldering or welding to the slightly curved lower member 19 and separation thereof is prevented. The device gives slightly upon the contact of the hood 14 thereagainst and thus prevents any rattling therebetween.

From the above it will be appreciated that my device is extremely simple to manufacture, consisting of only two parts, is also very quickly installed in exactly its proper position, and also it may be readily removed whenever desired.

Having thus described my invention, what I claim as new is:

1. A windshield warmer comprising an upper member of curved cross section and having portion return bent along its edges, and a second member of slightly curved cross section, said second member being received in the channels formed at the edge of the first mentioned member whereby a passageway is formed between the members for the purpose described.

2. A windshield warmer as set forth in claim 1 in which the lower member has hooks integrally formed at one end thereof.

3. A windshield warmer consisting of an upper member curved laterally and a lower member fastened to the first mentioned member whereby a hollow conductor is formed, said second mentioned member having slits extending from one end thereof whereby a portion thereof may be bent outwardly for the purposes described.

4. A windshield warmer consisting of an upper member curved laterally, a lower member fastened to the first mentioned member whereby a hollow conductor is formed, hook means fastened to the tube at one end thereof and an apron extending adjacent said hook means for the purpose described.

In testimony whereof I affix my signature.

CHARLES A. MORGAN.